United States Patent
Navarro et al.

(10) Patent No.: US 11,594,219 B2
(45) Date of Patent: Feb. 28, 2023

(54) METHOD AND SYSTEM FOR COMPLETING AN OPERATION

(71) Applicant: The Toronto-Dominion Bank, Toronto (CA)

(72) Inventors: Miguel Navarro, Ewing, NJ (US); Levi Scott Sutter, Westampton, NJ (US)

(73) Assignee: The Toronto-Dominion Bank, Toronto (CA)

( * ) Notice: Subject to any disclaimer, the term of this patent is extended or adjusted under 35 U.S.C. 154(b) by 218 days.

(21) Appl. No.: 17/168,237

(22) Filed: Feb. 5, 2021

(65) Prior Publication Data
US 2022/0254340 A1 Aug. 11, 2022

(51) Int. Cl.
*G10L 15/22* (2006.01)
*G06F 16/635* (2019.01)
*H04W 4/80* (2018.01)

(52) U.S. Cl.
CPC ............ *G10L 15/22* (2013.01); *G06F 16/635* (2019.01); *H04W 4/80* (2018.02); *G10L 2015/223* (2013.01); *G10L 2015/227* (2013.01)

(58) Field of Classification Search
CPC ............... G10L 15/22; G10L 2015/223; G10L 2015/227; G06F 16/635; G06F 21/44; H04W 4/80; H04W 84/12; G06Q 40/02; H04L 63/00
See application file for complete search history.

(56) References Cited

U.S. PATENT DOCUMENTS

| | | | |
|---|---|---|---|
| 6,895,242 B2 | 5/2005 | Fu et al. | |
| 9,544,772 B2 | 1/2017 | Schrecker | |
| 9,761,241 B2 | 12/2017 | Maes et al. | |
| 10,475,464 B2 | 11/2019 | Park | |
| 2004/0010697 A1* | 1/2004 | White | G06F 21/31 713/186 |
| 2010/0330909 A1 | 12/2010 | Maddern et al. | |
| 2013/0042314 A1* | 2/2013 | Kelley | H04L 9/3215 726/9 |
| 2013/0085764 A1* | 4/2013 | Sawka | G06Q 10/06 705/2 |
| 2014/0046664 A1 | 2/2014 | Sarkar et al. | |
| 2020/0241829 A1* | 7/2020 | Long | G06F 3/16 |

* cited by examiner

*Primary Examiner* — Abul K Azad
(74) *Attorney, Agent, or Firm* — Rowand LLP

(57) ABSTRACT

A computer server system comprises a communications module; a processor coupled with the communications module; and a memory coupled to the processor and storing processor-executable instructions which, when executed by the processor, configure the processor to receive, via the communications module and from a server associated with a first device, a request to perform an operation; determine that the first device cannot perform the operation; send, via the communications module and to the server associated with the first device, a signal causing the first device to output a message indicating that the first device cannot perform the operation and requesting authentication from a second device; receive, via the communications module and from the second device, a signal including authentication information; and send, via the communications module and to the second device, a signal including a selectable option to perform the operation.

20 Claims, 6 Drawing Sheets

METHOD AND SYSTEM FOR COMPLETING AN OPERATION

TECHNICAL FIELD

The present application relates to methods and systems for completing an operation.

BACKGROUND

Smart speakers such as the Amazon™ Echo™ and the Google™ Home™ provide interactive voice assistance that can respond to voice queries from users and undertake tasks responsive to such voice queries.

Smart speakers may allow third-parties to provide software to expand the capability of their voice assistants. For example, the Amazon Echo can be expanded with software plug-ins Amazon refers to as Alexa Skills and the Google Home can be expanded with similar plug-ins called Google Assistant Actions.

Although the capability of smart speakers and/or their voice assistants may be expanded, smart speakers and/or their voice assistants have limited functionality when it comes to interacting with third-party mobile applications.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
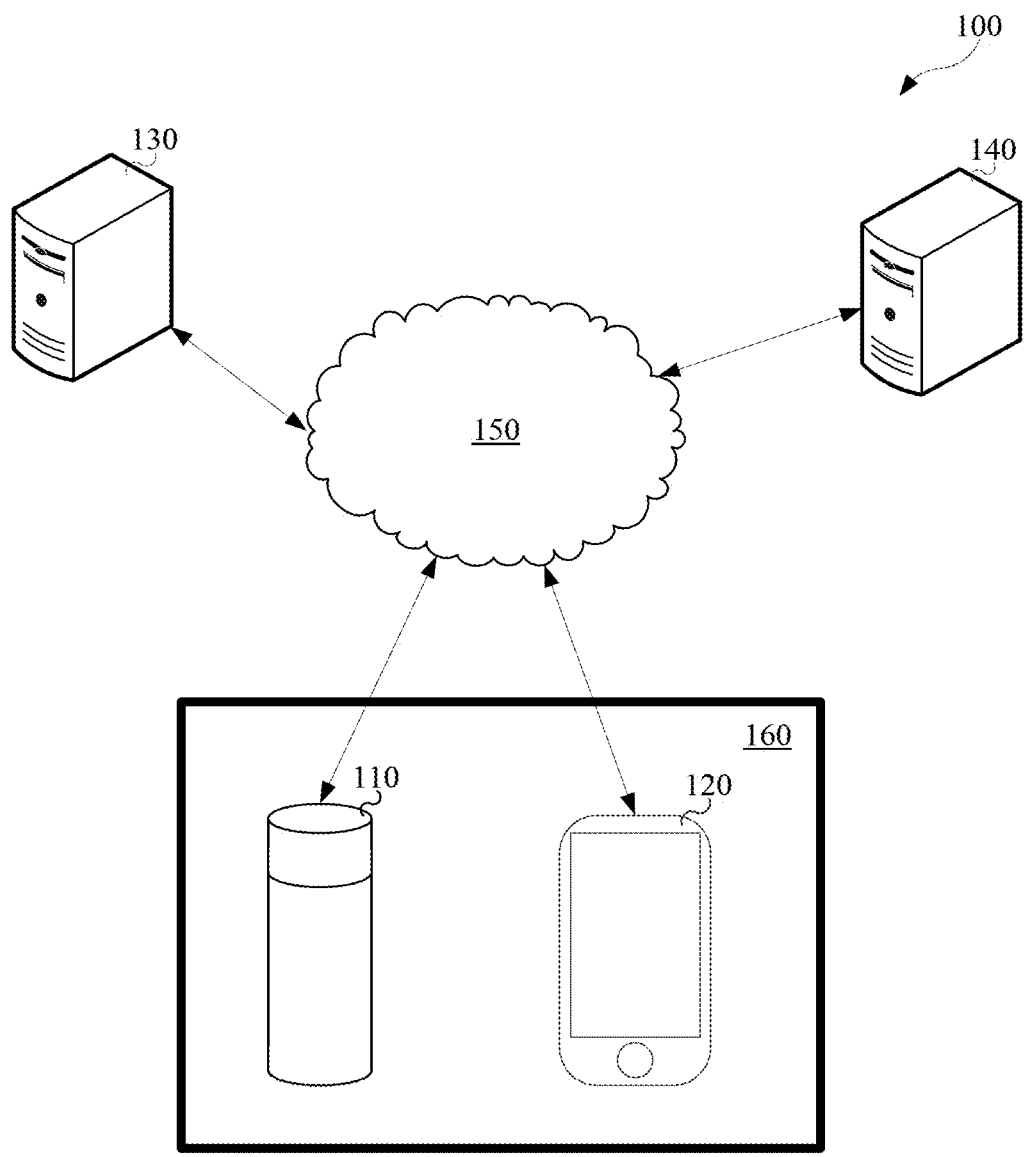
FIG. 1 is a schematic operation diagram illustrating an operating environment of an example embodiment.

In one aspect there is provided a computer server system comprising a communications module; a processor coupled with the communications module; and a memory coupled to the processor and storing processor-executable instructions which, when executed by the processor, configure the processor to receive, via the communications module and from a server associated with a first device, a request to perform an operation; determine that the first device cannot perform the operation; send, via the communications module and to the server associated with the first device, a signal causing the first device to output a message indicating that the first device cannot perform the operation and requesting authentication from a second device; receive, via the communications module and from the second device, a signal including authentication information; and send, via the communications module and to the second device, a signal including a selectable option to perform the operation.

In one or more embodiments, the processor-executable instructions, when executed by the processor, configure the processor to receive, via the communications module and from the second device, a signal indicating selection of the selectable option; and responsive to receiving the signal indicating selection of the selectable option, perform the operation.

In one or more embodiments, determining that the first device cannot perform the operation includes determining that the first device does not have permission to perform the requested operation.

In one or more embodiments, determining that the first device cannot perform the operation includes determining that the first device does not have authenticating capabilities.

In one or more embodiments, the processor-executable instructions, when executed by the processor, configure the processor to responsive to determining that the first device cannot perform the operation, selecting the second device from a list of devices associated with an account; wherein the signal causing the first device to output the message includes identifying information of the second device.

In one or more embodiments, the processor-executable instructions, when executed by the processor, configure the processor to responsive to determining that the first device cannot perform the operation, selecting the second device from a list of devices connected to a same network as the first device.

In one or more embodiments, the signal causing the first device to output the message further causes the first device to send a signal to identify the second device.

In one or more embodiments, the signal identifying the second device is sent from the first device via Bluetooth.

In one or more embodiments, the first device includes a smart speaker device.

In one or more embodiments, the operation includes at least one of transferring value from a first data record to a second data record; completing a purchase; or locking a value card.

In another aspect there is provided a computer-implemented method comprising receiving, via a communications module and from a server associated with a first device, a request to perform an operation; determining that the first device cannot perform the operation; sending, via the communications module and to the server associated with the first device, a signal causing the first device to output a message indicating that the first device cannot perform the operation and requesting authentication from a second device; receiving, via the communications module and from the second device, a signal including authentication information; and sending, via the communications module and to the second device, a signal including a selectable option to perform the operation.

In one or more embodiments, the method further comprises receiving, via the communications module and from the second device, a signal indicating selection of the selectable option; and responsive to receiving the signal indicating selection of the selectable option, performing the operation.

In one or more embodiments, determining that the first device cannot perform the operation includes determining that the first device does not have permission to perform the requested operation.

In one or more embodiments, determining that the first device cannot perform the operation includes determining that the first device does not have authenticating capabilities.

In one or more embodiments, the method further comprises responsive to determining that the first device cannot perform the operation, selecting the second device from a list of devices associated with an account; wherein the signal causing the first device to output the message includes identifying information of the second device.

In one or more embodiments, the method further comprises responsive to determining that the first device cannot perform the operation, selecting the second device from a list of devices connected to a same network as the first device.

In one or more embodiments, the signal causing the first device to output the message further causes the first device to send a signal to identify the second device.

In one or more embodiments, the signal identifying the second device is sent from the first device via Bluetooth.

In one or more embodiments, the first device includes a smart speaker device.

According to another aspect there is provided a non-transitory computer readable storage medium comprising computer-executable instructions which, when executed, configure a processor to receive, via a communications module and from a server associated with a first device, a request to perform an operation; determine that the first device cannot perform the operation; send, via the communications module and to the server associated with the first device, a signal causing the first device to output a message indicating that the first device cannot perform the operation and requesting authentication from a second device; receive, via the communications module and from the second device, a signal including authentication information; and send, via the communications module and to the second device, a signal including a selectable option to perform the operation.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a system 100 which may be used, for example, to complete an operation. As shown, the system 100 includes an electronic device 110, a computing device 120, a first server computer system 130 and a second server computer system 140 coupled to one another through a network 150, which may include a public network such as the Internet and/or a private network.

In this embodiment, the electronic device 110 and the computing device 120 are disposed in an environment 160. Put another way, the electronic device 110 and the computing device 120 are physically proximate.

The electronic device 110 is configured to communicate with the first server computer system 130 via the network 150 and vice-versa. The first server computer system 130 may be remote from the environment 160.

The computing device 120 is configured to communicate with the second server computer system 140 via the network 150 and vice-versa. The second server computer system 140 may be remote from the environment 160.

The first server computer system 130 is configured to communicate with the second server computer system 140 via the network 150 and vice-versa. The first server computer system 130 may be remote from the second server computer system 140.

The electronic device 110 is a computer system. In this embodiment, the electronic device 110 is a smart speaker. For example, the electronic device 110 may be a Google Home speaker or an Amazon Echo. The electronic device 110 may include one or more microphones for capturing acoustic signals (sounds) from the environment proximate the electronic device 110 (i.e. the environment 160) and one or more speakers for providing acoustic signals to the environment proximate the electronic device 110. Additionally or alternatively, the electronic device 110 may include one or more other components such as, for example, a hardware processor. The electronic device 110 may be adapted to provide a voice assistant. A user may interact with the electronic device 110 by providing voice utterances and the electronic device 110 may provide acoustic signals responsive to the voice utterances. In this way, the electronic device 110 may be used to complete one or more tasks or operations and/or to access one or more services.

The computing device 120 is a computer system. The computing device 120 may be, for example, a smartphone as shown. The computing device 120 may, however, be a computing device of another type such as for example a personal computer, a laptop computer, a tablet computer, a notebook computer, a hand-held computer, a personal digital assistant, a portable navigation device, a mobile phone, a smart phone, a wearable computing device (e.g. a smart watch, a wearable activity monitor, wearable smart jewelry, a glasses and other optical devices that include optical head-mounted displays), and any other type of computing device that may be configured to store data and software instructions, and execute software instructions to perform operations consistent with disclosed embodiments. In certain embodiments, the computing device 120 may be adapted to present a graphical user interface that allows for communication with the second server computer system 140.

The first server computing system 130 may have a trust relationship with the electronic device 110. Specifically, the electronic device 110 may trust the first server computer system 130 and/or the first server computer system 130 may trust the electronic device 110. For example, it may be that an account links the electronic device 110 and first server computer system 130 and that the first server computer system 130 trusts the electronic device 110 because it has authenticated with the first server computer system 130 relative to the account. The account may be, for example, a Google account where the electronic device 110 is a Google Home speaker. In another example, the account may be an Amazon account where the electronic device 110 is an Amazon Echo. The first server computer system 130 may service the electronic device 110 such as, for example, by providing a natural language processing service utilized by a voice assistant provided by the electronic device 110. In providing such a service and/or other services, the first server computer system 130 may perform one or more functions responsive to input received from the electronic device 110. Such functions may, as further described below, include determining one or more intents associated with input (e.g. utterances) received from the electronic device 110 via the network 150. Additionally or alternatively, such functions may, as further described below, include communicating with the second server computer system 140.

The first server computer system 130 may include a plug-in module configured to enable one or more plug-ins capable of processing various tasks and/or operations responsive to input received from the electronic device 110. The plug-in module may correspond to first party applications and/or third-party applications operable to perform different tasks or actions. For example, based on the context of audio received from the electronic device 110, the first server computer system 130 may use a certain application to retrieve or generate a response, which in turn may be communication back to the electronic device 110.

The second server computer system 140 may have a trust relationship with the computing device 120. More specifically, the computing device 120 may trust the second server computer system 140 and/or the second server computer system 140 may trust the computing device 120. For example, it may be that one or both of the computing device 120 and the second server computer system 140 has authenticated with the other of the computing device 120 and the second server computer system 140 thereby establishing a trust relationship therebetween.

The second server computer system 140 may be a financial institution server which may maintain customer bank accounts. That is, the second server computer system 140 may maintain a database that includes various data records. A data record may, for example, reflect an amount of value stored in a particular account associated with a user.

Each account maintained by the second server computer system 140 may be associated with authentication information. The authentication information may be or may include any one or more of a token, a username, a password, a personal identification number (PIN), biometric data, etc. The authentication information may be used by the second server computer system 140 to authenticate a device such as for example the electronic device 110 and/or the computing device 120. More specifically, the authentication information may be used to determine that the electronic device 110 and/or computing device 120 is/are being operated by an authorized user and to identify the one or more accounts the user is trying to access.

The second server computer system 140 may additionally or alternatively be an application server associated with an application that is resident on the computing device 120. For example, the second server computer system 14 may connect the computing device 120 to a back-end system associated with the mobile application. The application server may maintain accounts and each account may be associated with authentication information.

The first server computer system 130 and the second server computer system 140 are computer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 150 is a computer network. In some embodiments, the network 150 may be an internetwork such as may be formed of one or more interconnected computer networks. For example, the network 150 may be or may include an Ethernet network, a wireless network, a telecommunications network, or the like. The network 150 may be the Internet.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
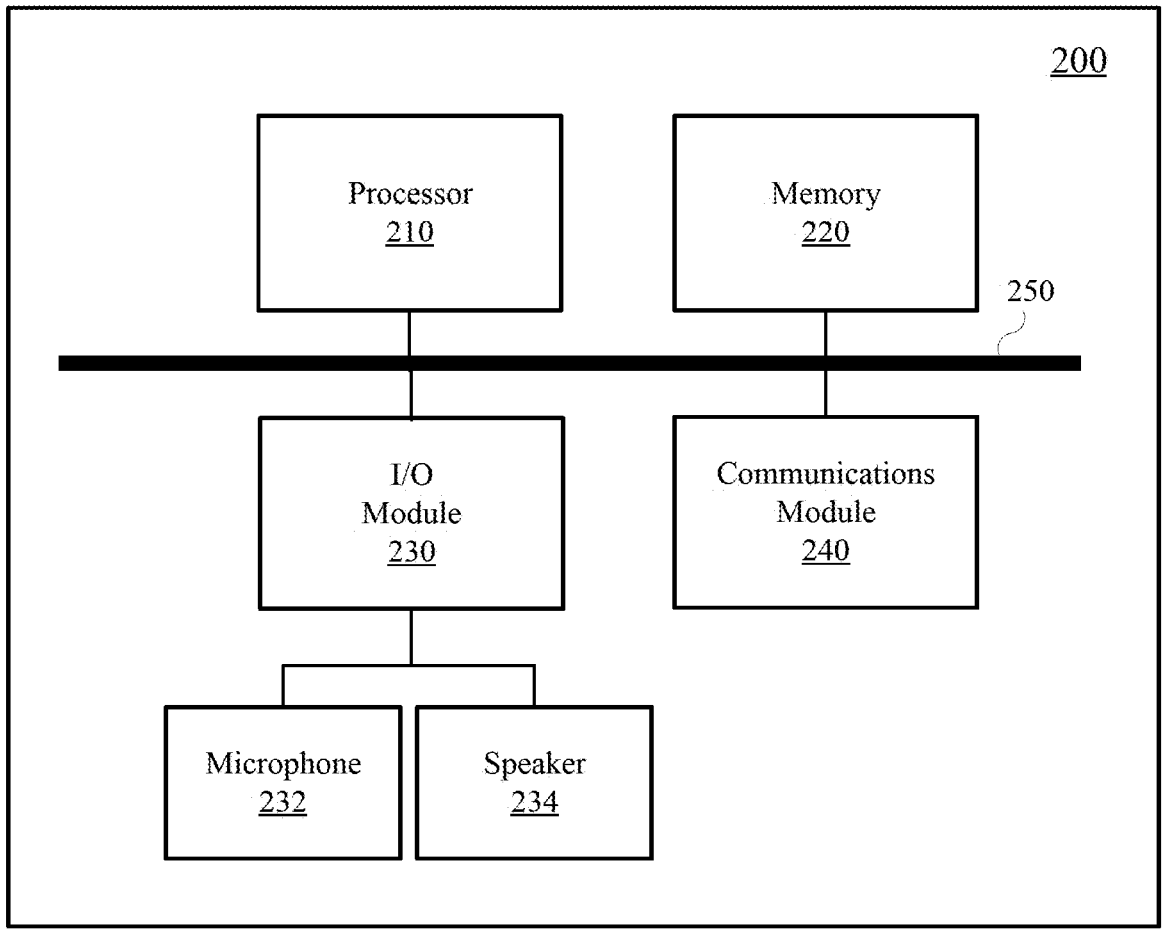
FIG. 2 is a high-level schematic diagram showing components of an example electronic device.

FIG. 2 is a simplified schematic diagram showing components of an electronic device 200. The electronic device 110 may be of the same type as the electronic device 200. The electronic device 200 includes a variety of modules. For example, as illustrated, the electronic device 200 may include a processor 210, a memory 220, an input/output module 230 and/or a communications module 240. As illustrated, the example foregoing modules are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the electronic device 200.

The I/O module 230 is an input module and an output module. As an input module, the I/O module 230 allows the electronic device 200 to receive input from components of the electronic device 200. As an output module, the I/O module 230 allows the electronic device 200 to provide output to components of the electronic device 200. For example, the I/O module 230 may, as illustrated, be in communication with a microphone 232 and a speaker 234. The microphone 232 may include one or more microphones which may, for example, form a microphone array. The microphone 232 may be employed for capturing acoustic signals from the environment proximate the electronic device 200. The speaker 234 may include one or more speakers for providing acoustic signals to the environment proximate the electronic device 200. In summary, the I/O module 230 may allow the electronic device 200 to receive input via a microphone 232 and provide output via a speaker 234.

The communications module 240 allows the electronic device 200 to communicate with other computing devices and/or various communications networks such as, for example, the network 150. The communications module 240 may allow the electronic device 200 to send or receive communications signals. Communications signals may be sent or received according to one or more protocols or according to one or more standards. For example, the communications module 240 may allow the electronic device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the electronic device 200 to communicate via Wi-Fi™, using Bluetooth™ or via some combination of one or more networks or protocols. In some embodiments, all or a portion of the communications module 240 may be integrated into a component of the electronic device 200. For example, the communications module 240 may be integrated into a communications chipset.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220. Such software may, for example, adapt the electronic device 200 to serve as a smart speaker such as, for example, to provide voice assistant services.

Figure 3:
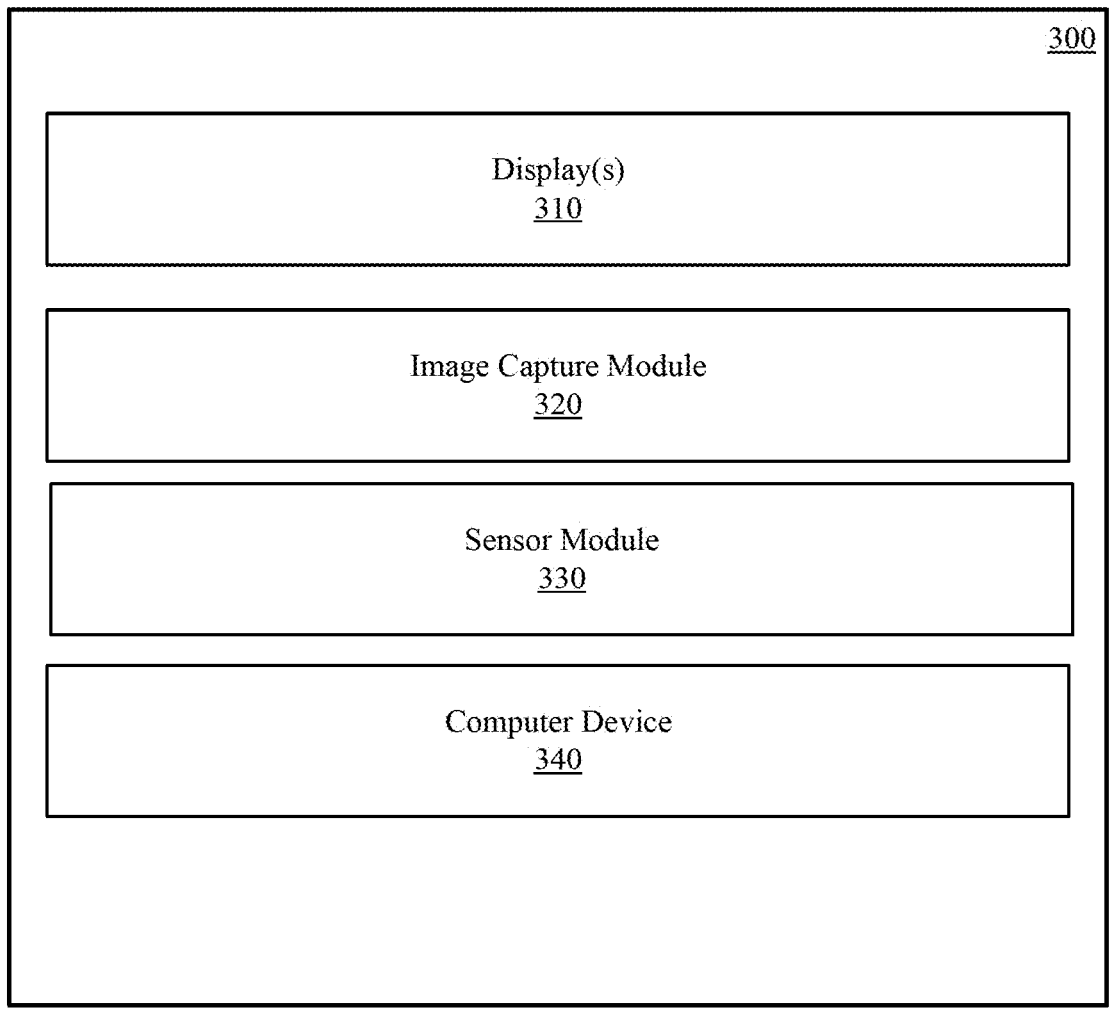
FIG. 3 is a simplified schematic diagram showing components of a computing device.

FIG. 3 is a simplified schematic diagram showing components of an exemplary computing device 300. The computing device 120 may be of the same type as computing device 300. The computing device 300 may include modules including, as illustrated, for example, one or more displays 310, an image capture module 320, a sensor module 330, and a computer device 340.

The one or more displays 310 are a display module. The one or more displays 310 are used to display screens of a graphical user interface that may be used, for example, to communicate with the second server computer system 140 (FIG. 1). The one or more displays 310 may be internal displays of the computing device 300 (e.g., disposed within a body of the computing device).

The image capture module 320 may be or may include a camera. The image capture module 320 may be used to obtain image data, such as images. The image capture module 320 may be or may include a digital image sensor system as, for example, a charge coupled device (CCD) or a complementary metal-oxide-semiconductor (CMOS) image sensor.

The sensor module 330 may be a sensor that generates sensor data based on a sensed condition. By way of example, the sensor module 330 may be or include a location subsystem which generates location data indicating a location of the computing device 300. The location may be the current geographic location of the computing device 300. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 340 is in communication with the one or more displays 310, the image capture module 320, and the sensor module 330. The computer device 340 may be or may include a processor which is coupled to the one or more displays 310, the image capture module 320, and/or the sensor module 330.

Figure 4:
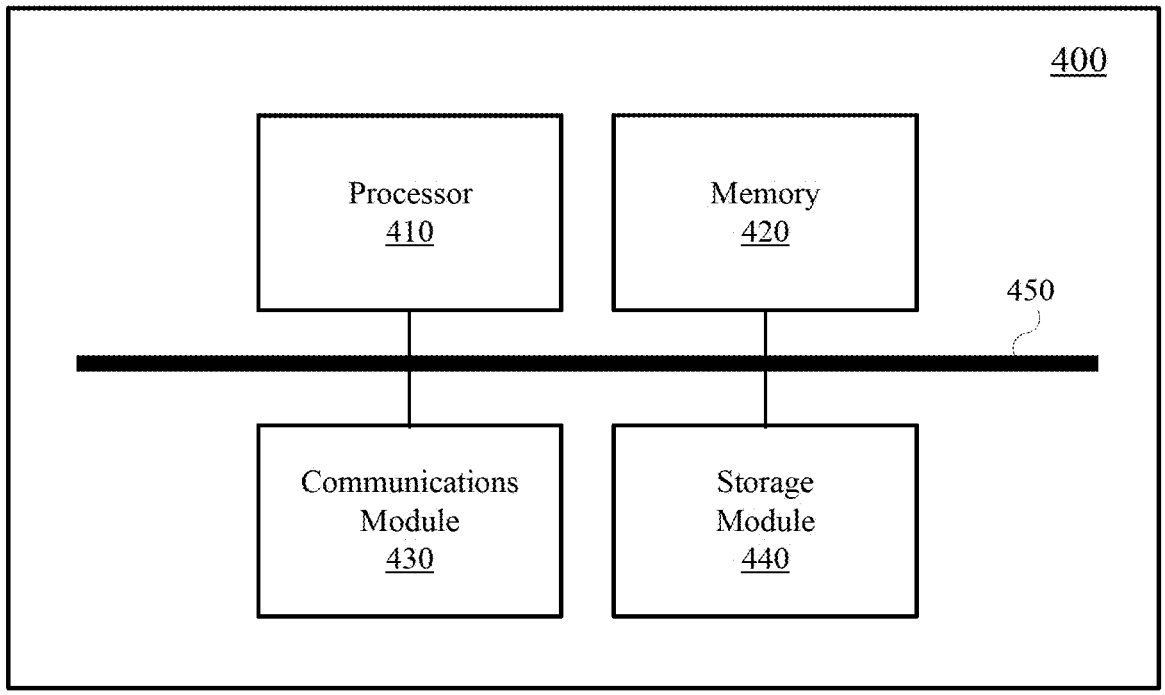
FIG. 4 is a high-level schematic diagram of an example computer device.

Referring now to FIG. 4, a high-level operation diagram of an example computer device 400 is shown. In some embodiments, the computer device 400 may be exemplary of the computer device 340 (FIG. 3), the first server computer system 130 and/or the second server computer system 140.

The example computer device 400 includes a variety of modules. For example, as illustrated, the example computer device 400 may include a processor 410, a memory 420, a communications module 430, and/or a storage module 440. As illustrated, the foregoing example modules of the example computer device 400 are in communication over a bus 450.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 400.

The communications module 430 allows the example computer device 400 to communicate with other computer or computing devices and/or various communications networks. For example, the communications module 430 may allow the example computer device 400 to send or receive communications signals. Communications signals may be sent or received according to one or more protocols or according to one or more standards. For example, the communications module 430 may allow the example computer device 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 430 may allow the example computer device 400 to communicate using near-field communication (NFC), via Wi-Fi™, using Bluetooth™ or via some combination of one or more networks or protocols. In some embodiments, all or a portion of the communications module 430 may be integrated into a component of the example computer device 400. For example, the communications module may be integrated into a communications chipset.

The storage module 440 allows the example computer device 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely. The storage module may also be referred to as a data store.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
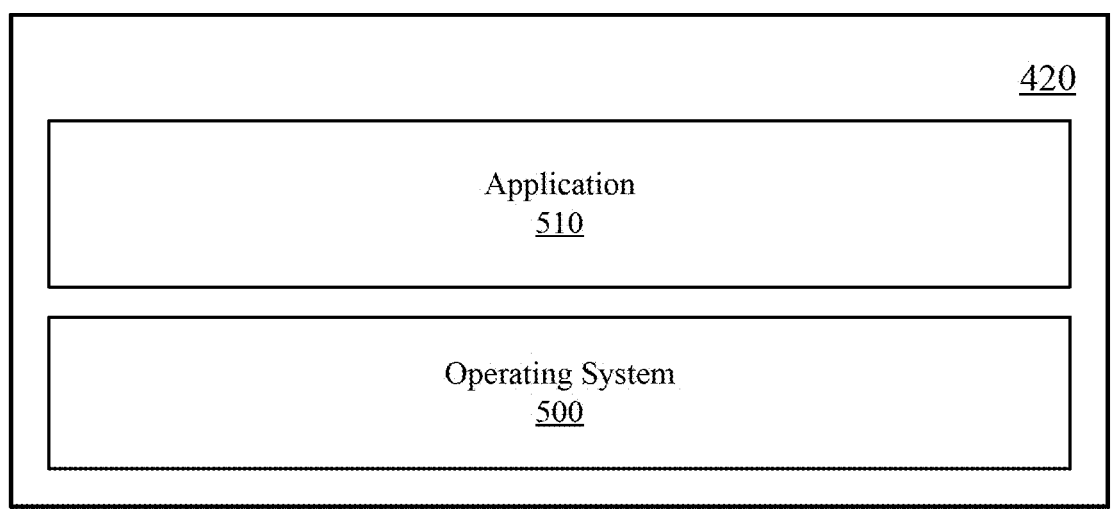
FIG. 5 shows a simplified organization of software components stored in a memory of the example computer device of FIG. 4.

FIG. 5 depicts a simplified organization of software components stored in the memory 420 of the example computer device 400 (FIG. 4). As illustrated, these software components include an operating system 500 and an application 510.

The operating system 500 is software. The operating system 500 allows the application 510 to access the processor 410, the memory 420, and the communications module 430 of the example computer device 400 (FIG. 4). The operating system 500 may be, for example, Google™ Android™, Apple™ iOS™, UNIX™, Linux™, Microsoft™ Windows™, Apple OSX™ or the like.

The application 510 adapts the example computer device 400, in combination with the operating system 500, to operate as a device performing a particular function. For example, the application 510 may cooperate with the operating system 500 to adapt a suitable embodiment of the example computer device 400 to operate as the computer device 340 (FIG. 2), the first server computer system 130 and/or the second server computer system 140.

While a single application 510 is illustrated in FIG. 5, in operation the memory 420 may include more than one application 510 and different applications 510 may perform different operations. For example, in at least some embodiments in which the computer device 400 is functioning as the computing device 120, the applications 510 may include a banking application. The banking application may be configured for secure communications with the second server computer system 140 and may provide various banking functions such as, for example, the ability to display a quantum of value in one or more data records (e.g. display balances), configure or request that operations such as transfers of value (e.g. bill payments, email money transfers and other transfers) be performed, and other account management functions.

By way of further example, in at least some embodiments in which the computer device 400 functions as the computing device 120, the applications 510 may include a web browser, which may also be referred to as an Internet browser. In at least some such embodiments, the second server computer system 140 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

By way of further example, in at least some embodiments in which the computer device 400 functions as the computing device 120, the applications 510 may include an electronic messaging application. The electronic messaging application may be configured to display a received electronic message such as an email message, short messaging service (SMS) message, or a message of another type. In at least some embodiments, the second server computer system 140 may be configured, through computer-executable instructions, to send an electronic message to the computing device 120. For example, the second server computer system 140 may be configured to send a SMS message to a phone number associated with a user and an electronic messaging application on the computing device 120 may be configured to retrieve the message and display the message to the user. As another example, the second server computer system 140 may be configured to send an email message to an email address associated with a user and an email application on the computing device 120 may be configured to retrieve the message and display the message to the user.

As mentioned, the first server computer system 130 may include a plug-in module configured to enable one or more plug-ins capable of processing various tasks and/or operations responsive to input received from the electronic device 110. The plug-in module may correspond to first party applications and/or third-party applications operable to perform different tasks or actions. The plug-in modules may include, for example, Alexa Skills and/or Google Assistant Actions. Based on the context of audio received from the electronic device 110, the first server computer system 130 may use a certain plug-in module to retrieve or generate a response, which in turn may be communicated back to the electronic device 110.

In one or more embodiments, the plug-in module may allow the first server computer system 130 to communicate with the second server computer system 140. For example, the plug-in module may correspond to a third-party application such as for example a banking application. As will be described in more detail, the banking application corresponding to the plug-in module may be similar to the banking application resident on the computing device 120 with the exception that the banking application corresponding to the plug-in module may have limited functionality. In this manner, when the plug-in module associated with the banking application has been enabled by a user via the electronic device 110, the user may request and obtain information associated with one or more data records maintained by the second server computer system 140.

To enable the banking application plug-in module, a user may be in the environment 160 and may submit input in the form of a voice utterance requesting that the plug-in be enabled. For example, where the electronic device 110 is an Amazon Echo, the user may say "Hey Alexa, enable The Banking Application." The user may alternatively enable the banking application by logging into their account associated with the electronic device 110 and this may be done using, for example, the computing device 120.

As mentioned, each account maintained by the second server computer system 140 may be associated with authentication information. The authentication information may be or may include any one or more of a token, a username, a password, a personal identification number (PIN), biometric data, etc. Responsive to the user enabling the plug-in module on the electronic device 110, the user may be prompted to enter authentication information to link the electronic device 110 to their account. For example, the second server computer system 140 may send a signal to the first server computer system 130 requesting authentication information. The first server computer system 130 may send a signal to the electronic device 110 causing the electronic device 110 to output a command requesting that the user authenticate the electronic device 110. The user may use the banking application or web browser executing on the computing device 120 to enter authentication information to link the electronic device 110 to their account. The user may also select one or more permissions to be granted to the electronic device 110. For example the user may provide read-only access to the electronic device 110. As another example, the user may permit the electronic device 110 to accept a transfer of funds into the account but may not permit the electronic device 110 to transfer funds out of the account. The user may also be prompted to (optionally)

create a password such as a four-digit PIN that may be used by the electronic device 110 to authenticate the user at the electronic device 110.

The second server computer system 140 may maintain a list of devices used to access a particular account. Put another way, the list may include devices that are currently logged into or have recently logged into the particular account. For each device, the list may include information such as for example identifying information of the device (e.g. "Jim's Phone"), the application used to access the account (e.g. a plug-in, a mobile application, a web browser), permissions granted to the device (e.g. full access, limited access, read-only access) the network used by the device to access the account (e.g. an IP address), whether or not the device is currently logged into the account, a time that the device most recently logged into the account and/or a time that the device most recently logged out of the account. The second server computer system 140 may additionally obtain a list of devices connected to a particular network. For example, the second server computer system 140 may engage an application programming interface (API) to identify devices connected to a particular Wi-Fi network.

Figure 6:
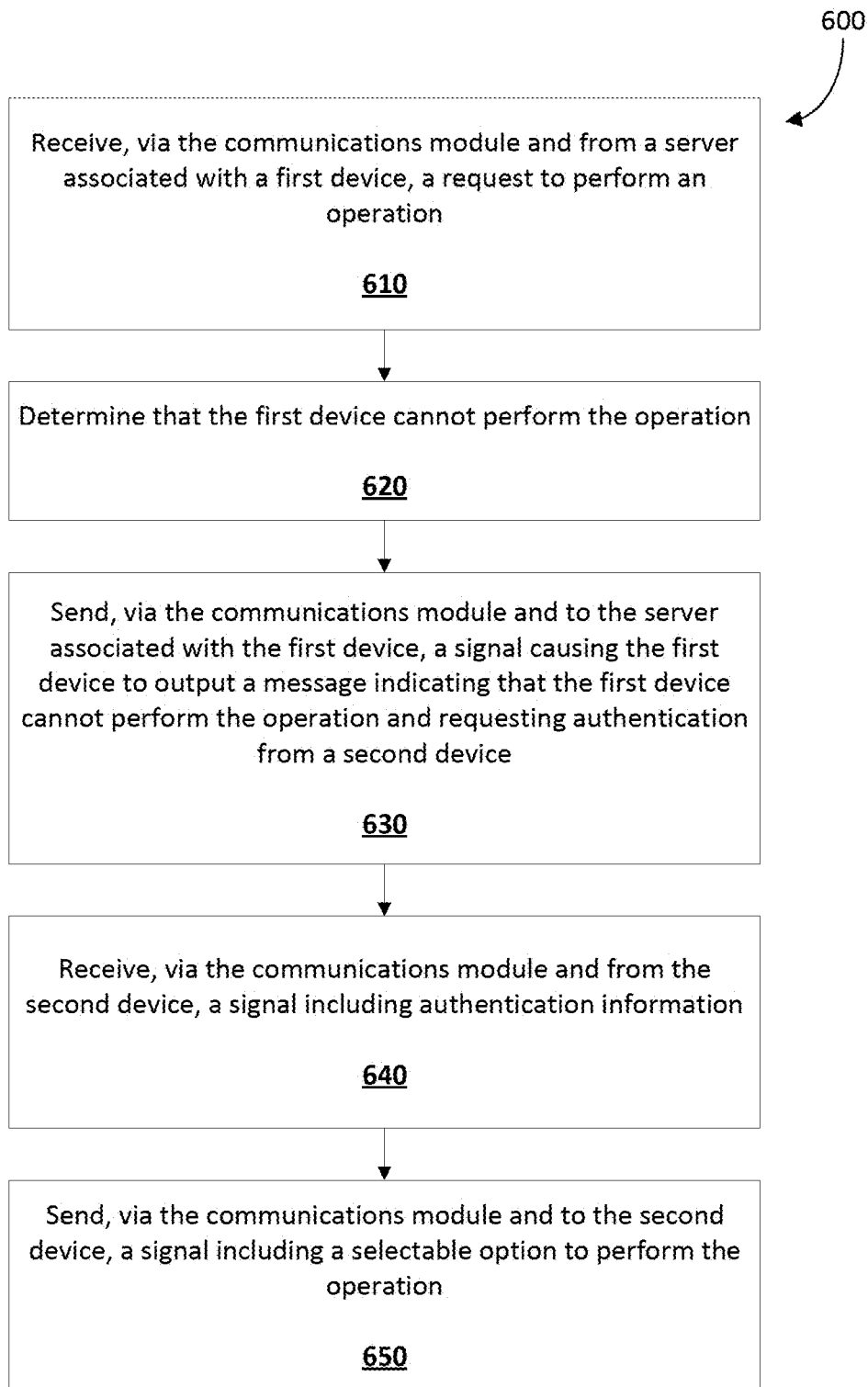
FIG. 6 is flowchart showing operations performed by a server in completing an operation according to an embodiment.

The second server computer system 140 may complete one or more operations based on the context of audio received by the electronic device 110. FIG. 6 is a flowchart showing operations performed by the second server computer system 140 in completing an operation according to an embodiment. The operations may be included in a method 600 which may be performed by the second server computer system 140. For example, computer-executable instructions stored in memory of the second server computer system 140 may, when executed by one or more processors, configure the second server computer system 140 to perform the method 600 or a portion thereof.

The second server computer system 140 receives, via the communications module and from a server associated with a first device, a request to perform an operation (step 610). In this embodiment, the first device is the electronic device 110 and the server associated with the first device is the first server computer system 130.

A user may be in the environment 160 and may submit input in the form of a voice utterance requesting that one or more operations be completed. For example, where the electronic device 110 is an Amazon Echo, the user may say "Hey Alexa, transfer $50 from my chequing account to my savings account."

The electronic device 110 may communicate the voice utterance as voice data to the first server computer system 130. The first server computer system 130 may analyze the voice data and convert the voice data to text using, for example, natural language processing. The text is then parsed and processed to determine an intent (e.g. command) matching the voice utterance contained in the voice data and one or more parameters for the intent. Based on the intent and one or more parameters for the intent, the first server computer system 130 may identify a plug-in module required to complete the one or more operations. For example, the first server computer system 130 may identify the banking application plug-in as being the plug-in module required to complete the one or more operations (transfer $50 from a chequing account to a savings account) and as such the first server computer system 130 may send a signal including the request to complete the one or more operations to the second server computer system 140. The request may include data identifying the operation to be performed (transfer $50 from a chequing account to a savings account) and data identifying the device where the request was initiated, which in this embodiment is the electronic device 110.

In embodiments where the user must authenticate at the electronic device 110, responsive to receiving the request to complete the one or more operations, the second server computer system 140 may send a signal to the first server computer system 130 requesting authentication information. In turn, the first server computer system 130 may send a signal to the electronic device 110, the signal causing the electronic device 110 to output a message requesting the authentication information. For example, the electronic device 110 may say "Please say your four-digit PIN associated with your account."

The user may submit input in the form of a voice utterance to provide their four-digit PIN. The voice utterance may be processed in manners similar to that described herein. The four-digit PIN is provided by the first server computer system 130 to the second server computer system 140 to authenticate the electronic device 110. In the event that the electronic device 110 cannot be authenticated, for example if the four-digit PIN is incorrect, the second server computer system 140 may send a signal causing the electronic device 110 to output a message indicating that authentication has failed.

The second server computer system 140 determines that the first device cannot perform the operation (step 620).

In this embodiment, determining that the first device cannot perform the operation is based on permissions granted (or not granted) to the first device. For example, as mentioned, the second server computer system 140 maintains a list of devices used to access the account, the list including permissions granted to each device. In this embodiment, the electronic device 110 may have read-only access to the account and/or may not transfer funds out of the account. Since the requested operation includes transferring funds out of the account (e.g. the chequing account), the second server computer system 140 determines that the first device cannot perform the operation.

In another embodiment, determining that the first device cannot perform the operation includes determining that the first device does not have authenticating capabilities. For example, in one or more embodiments the user may not have set up a password to authenticate the electronic device 110 and as such the second server computer system 140 may determine that the electronic device 110 does not have authenticating capabilities.

The second server computer system 140 sends, via the communications module and to the server associated with the first device, a signal causing the first device to output a message indicating that the first device cannot perform the operation and requesting authentication from a second device (step 630).

In this embodiment, the signal is sent to the first server computer system 130. The first server computer system 130 may convert the signal to voice data and the voice data may be sent to the electronic device 110. Responsive to receiving the voice data, the electronic device 110 may output a message saying "I cannot complete this operation. Please log into The Banking Application on a different device to complete the operation."

In one or more embodiments, the second server computer system 140 may identify the second device and identifying information of the second device may be included in the signal sent to the first server computer system 130. For example, the second server computer system 140 may identify a device that has recently logged into the account and that is connected to a same network as the electronic device 110. As such, the signal sent to the first server computer system 130 may be processed to cause the electronic device 110 to output a message saying "I cannot complete this operation. Please log into The Banking Application on Jim's Phone to complete the operation."

In at least some embodiments, the user may only use the second device identified by the second server computer system 140. In the event that the user does not have access to the second device, the user may request that a different device be selected by the second server computer system 140 and this may be done by the user submitting input in the form of a voice utterance. For example, the user may say "I do not have Jim's Phone. Can I use Jim's Laptop instead?" The second server computer system 140 may process this input (received by way of the first server computer system 130) and may accordingly provide a response. For example, if Jim's Laptop is found on the device list, the second server computer system 140 may permit the user to log into their account using "Jim's Laptop".

It will be appreciated that in at least some embodiments the user may still log into a device that is not "Jim's Phone" to complete the operation and does not need permission from the second server computer system 140 to do so.

In one or more embodiments, the second server computer system 140 may request that the user log into the banking application via any device that is connected to a same network as the electronic device 110. For example, the signal sent to the first server computer system 130 may be processed to cause the electronic device 110 to output a message saying "I cannot complete this operation. Please log into The Banking Application on another device connected to your Wi-Fi network to complete the operation."

The second device may be, for example, the computing device 120.

The second server computer system 140 receives, via the communications module and from the second device, a signal including authentication information (step 640).

The authentication information may be or may include any one or more of a token, a username, a password, a PIN, biometric data, etc. The authentication information of the user is analyzed by the second server computer system 140 to authenticate the second device. For example, the second server computer system 140 may confirm that the username and password are associated with a particular account maintained thereby. Using the authentication information, the second server computer system 140 may also determine that the particular account is associated with the same account as the electronic device 110.

The second server computer system 140 sends, via the communications module and to the second device, a signal including a selectable option to perform the operation (step 650).

Responsive to authenticating the second device, the second server computer system 140 send a signal including a selectable option to perform the operation. For example, the signal may cause the second device, which in this embodiment is the computing device 120, to display a GUI that includes information identifying the operation to be performed. The GUI may include a selectable option that, when selected by the user via touch input on a display screen of the computing device 120, causes the computing device 120 to send a signal to the second server computer system 140 indicating that the user has requested that the operation be performed.

In embodiments described herein, the second server computer system receives a request in the form of a voice command to perform an operation from a device that is not able to perform the operation. For example, the device may not have permission to perform the operation and/or may not be capable of obtaining sufficient authentication information. The second server computer system pre-conditions a second device to perform the operation such that, when a user has logged into the second device, the user is presented with a selectable option to complete the operation. In this manner, the user is required to authenticate via a device (the second device) that is capable of obtaining sufficient authentication information and this is done to ensure that the user confirming that the operation is to be completed is the user associated with the account.

Figure 7:
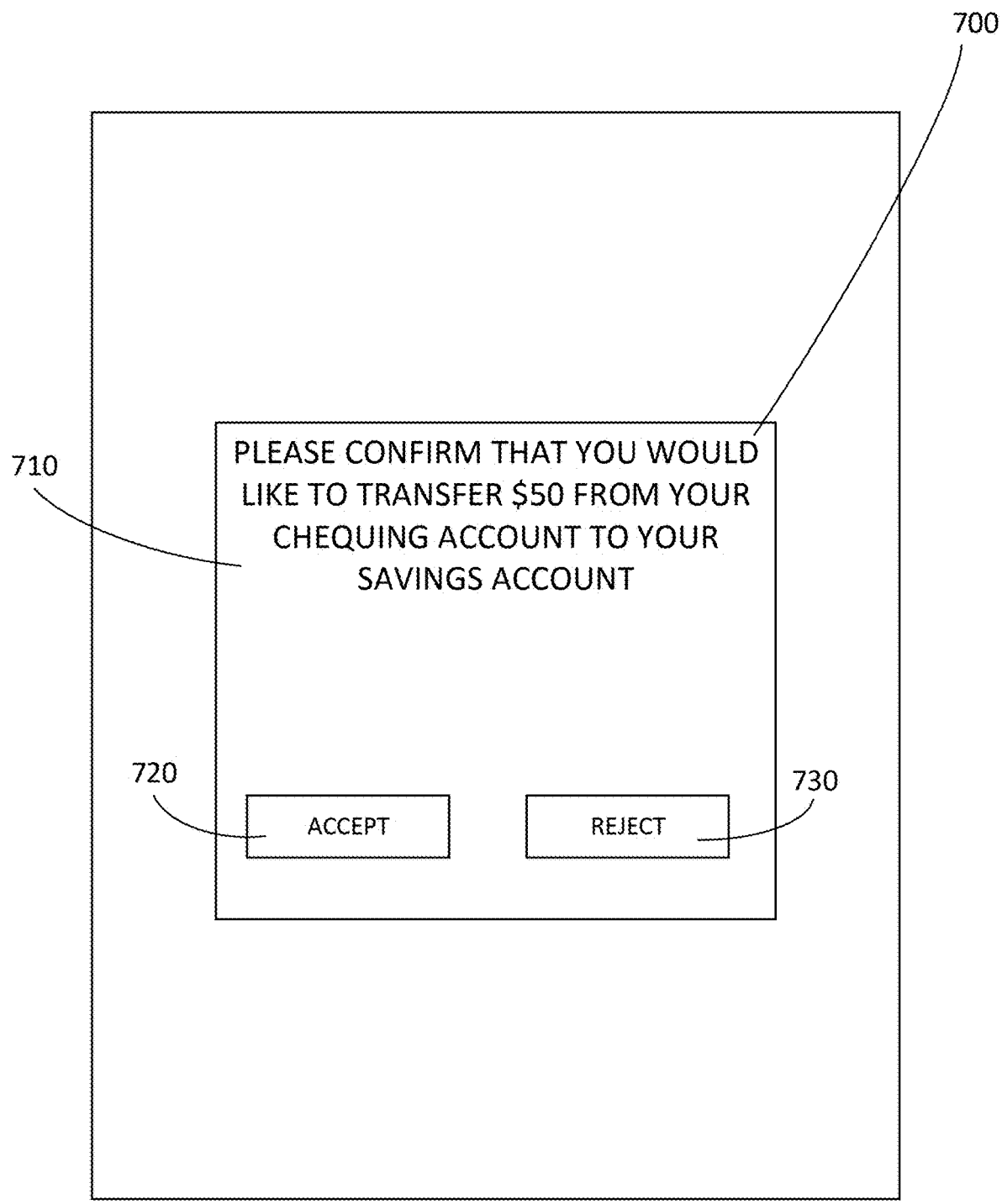
FIG. 7 is an example graphical user interface including a selectable option to complete an operation.

An example GUI 700 is shown in FIG. 7. As can be seen, the GUI 700 includes information 710 identifying the operation to be performed. In this example, the operation to be performed includes transferring $50 from the chequing account to the savings account. The GUI 700 includes a selectable option 720 that may be selected by the user to confirm that the user would like to complete the operation and a selectable option 730 that may be selected by the user to reject the operation.

Responsive to the user selecting the selectable option 720, the computing device 120 sends a signal to the second server computer system 140 indicating selection of the selectable option 720. Responsive to receiving the signal indicating selection of the selectable option, the second server computer system 140 completes the operation.

To complete the operation, the second server computer system 140 may update the data records associated with the chequing account and the savings account to transfer $50 from the data record associated with the chequing account to the data record associated with the savings account.

Other examples of operations that may be performed using the system 100 include locking a value card such as for example a credit card. For example, the user submit input in the form of a voice utterance requesting that their credit card be locked. Where the electronic device is an Amazon Echo device, the user may say "Hey Alexa, please lock my credit card." Responsive to the input, operations of method 600 may be executed and the electronic device may output a message saying "Please log into your bank account to complete this operation." The user may log into their bank account using the second device and a GUI may be displayed, the GUI including a selectable option to lock their credit card.

Although in embodiments described herein at least some operations are related to banking or mobile banking, other operations may be performed. For example, a mobile application and a plug-in module may be related to online shopping. In this example, the user may submit input in the form of a voice utterance requesting that the computing device purchase a particular item from a website. Responsive to the input, operations of method 600 may be executed and the electronic device may output a message saying "Please log into your Amazon account to complete the purchase." The user may log into their Amazon account using the second device and a checkout page may be displayed, the checkout page including a selectable option to complete the purchase.

As another example, a mobile application and a plug-in module may be related to a stock trading platform. In this example, the user may submit input in the form of a voice utterance requesting that the computing device purchase a number of shares of a particular stock. Responsive to the input, operations of method 600 may be executed and the electronic device may output a message saying "Please log into your trading account to complete the purchase." The user may log into their trading account using the second device and a GUI may be displayed, the GUI including a selectable option to complete the purchase.

Although in embodiments described herein the second device may be selected by the second server computer system 140, in one or more embodiments the second device may be selected by the first device. For example, the signal causing the first device to output the message send during step 630 of method 600 may further cause the first device to send a signal to identify the second device. For example, the first device may identify the second device using Bluetooth. In this manner, the message output by the first device may request that the user log into the banking application using the second device, the second device being within Bluetooth range of the first device. As another example, the first device may identify the second device by determining that the second device is connected to the same Wi-Fi network as the first device. As yet another example, the first device may identify the second device based on a list of known devices associated with the user. As still yet another example, the first device may identify the second device using location services. For example, the first device may identify a location of one or more associated devices and may select the second device based on the second device being located close to the first device. As another example, the first device may send a signal to ping other devices within communication range and the second device may be identified by replying to the ping. As another example, the first device may determine one or more other devices that have a particular application downloaded thereon and the first device may select the second device from the one or more determined other devices.

In one or more embodiments, rather than requiring that the user log into the banking application on the second device to complete the operation, the user may only be required to log into the second device.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer server system comprising:
a communications module;
a processor coupled with the communications module; and
a memory coupled to the processor and storing processor-executable instructions which, when executed by the processor, configure the processor to:
receive, via the communications module and from a server associated with a first device, a request to perform an operation;
determine that the first device cannot perform the operation;
send, via the communications module and to the server associated with the first device, a signal causing the first device to output a message indicating that the first device cannot perform the operation and requesting authentication from a second device;
receive, via the communications module and from the second device, a signal including authentication information; and
send, via the communications module and to the second device, a signal including a selectable option to perform the operation.

2. The system of claim 1, wherein the processor-executable instructions, when executed by the processor, configure the processor to:
receive, via the communications module and from the second device, a signal indicating selection of the selectable option; and
responsive to receiving the signal indicating selection of the selectable option, perform the operation.

3. The system of claim 1, wherein determining that the first device cannot perform the operation includes determining that the first device does not have permission to perform the requested operation.

4. The system of claim 1, wherein determining that the first device cannot perform the operation includes determining that the first device does not have authenticating capabilities.

5. The system of claim 1, wherein the processor-executable instructions, when executed by the processor, configure the processor to:
responsive to determining that the first device cannot perform the operation, selecting the second device from a list of devices associated with an account;
wherein the signal causing the first device to output the message includes identifying information of the second device.

6. The system of claim 1, wherein the processor-executable instructions, when executed by the processor, configure the processor to:
responsive to determining that the first device cannot perform the operation, selecting the second device from a list of devices connected to a same network as the first device.

7. The system of claim 1, wherein the signal causing the first device to output the message further causes the first device to send a signal to identify the second device.

8. The system of claim 7, wherein the signal identifying the second device is sent from the first device via Bluetooth.

9. The system of claim 1, wherein the first device includes a smart speaker device.

10. The system of claim 1, wherein the operation includes at least one of:
transferring value from a first data record to a second data record;
completing a purchase; or
locking a value card.

11. A computer-implemented method comprising:
receiving, via a communications module and from a server associated with a first device, a request to perform an operation;
determining that the first device cannot perform the operation;

sending, via the communications module and to the server associated with the first device, a signal causing the first device to output a message indicating that the first device cannot perform the operation and requesting authentication from a second device;

receiving, via the communications module and from the second device, a signal including authentication information; and sending, via the communications module and to the second device, a signal including a selectable option to perform the operation.

12. The computer-implemented method of claim 11, further comprising:

receiving, via the communications module and from the second device, a signal indicating selection of the selectable option; and responsive to receiving the signal indicating selection of the selectable option, performing the operation.

13. The computer-implemented method of claim 11, wherein determining that the first device cannot perform the operation includes determining that the first device does not have permission to perform the requested operation.

14. The computer-implemented method of claim 11, wherein determining that the first device cannot perform the operation includes determining that the first device does not have authenticating capabilities.

15. The computer-implemented method of claim 11, further comprising:

responsive to determining that the first device cannot perform the operation, selecting the second device from a list of devices associated with an account;

wherein the signal causing the first device to output the message includes identifying information of the second device.

16. The computer-implemented method of claim 11, further comprising:

responsive to determining that the first device cannot perform the operation, selecting the second device from a list of devices connected to a same network as the first device.

17. The computer-implemented method of claim 11, wherein the signal causing the first device to output the message further causes the first device to send a signal to identify the second device.

18. The computer-implemented method of claim 17, wherein the signal identifying the second device is sent from the first device via Bluetooth.

19. The computer-implemented method of claim 11, wherein the first device includes a smart speaker device.

20. A non-transitory computer readable storage medium comprising computer-executable instructions which, when executed, configure a processor to:

receive, via a communications module and from a server associated with a first device, a request to perform an operation;

determine that the first device cannot perform the operation;

send, via the communications module and to the server associated with the first device, a signal causing the first device to output a message indicating that the first device cannot perform the operation and requesting authentication from a second device;

receive, via the communications module and from the second device, a signal including authentication information; and send, via the communications module and to the second device, a signal including a selectable option to perform the operation.

* * * * *